(12) United States Patent
Kaneko

(10) Patent No.: US 6,772,121 B1
(45) Date of Patent: Aug. 3, 2004

(54) VIRTUAL PET DEVICE AND CONTROL PROGRAM RECORDING MEDIUM THEREFOR

(75) Inventor: Yasumichi Kaneko, Chiba (JP)

(73) Assignee: Namco, Ltd., Tokyo (JP)

( * ) Notice: Subject to any disclaimer, the term of this patent is extended or adjusted under 35 U.S.C. 154(b) by 595 days.

(21) Appl. No.: 09/694,819

(22) Filed: Oct. 23, 2000

(30) Foreign Application Priority Data

Mar. 5, 1999 (JP) .......................................... 11-059029

(51) Int. Cl.[7] .............................................. G10L 11/00
(52) U.S. Cl. ..................... 704/270; 704/246; 704/272
(58) Field of Search ................................ 704/246, 270, 704/231, 232, 243, 272; 446/175

(56) References Cited

U.S. PATENT DOCUMENTS

| | | | | |
|---|---|---|---|---|
| 4,451,911 A | | 5/1984 | Klose et al. .................. | 369/31 |
| 4,717,364 A | * | 1/1988 | Furukawa .................... | 446/175 |
| 4,923,428 A | * | 5/1990 | Curran ........................ | 446/175 |
| 5,751,904 A | * | 5/1998 | Inazumi ...................... | 704/232 |
| 5,802,488 A | * | 9/1998 | Edatsune .................... | 704/231 |
| 2002/0035405 A1 | * | 3/2002 | Yokoo ......................... | 700/86 |
| 2002/0042713 A1 | * | 4/2002 | Kim ........................... | 704/272 |

FOREIGN PATENT DOCUMENTS

| | | |
|---|---|---|
| JP | 6-7746 Y | 1/1994 |
| JP | 6-315572 A | 11/1994 |
| JP | 7-83794 B | 9/1995 |
| JP | 7-113833 B | 12/1995 |
| JP | 8-202679 A | 8/1996 |
| JP | 3044486 Z | 6/1997 |
| JP | 10-33830 A | 2/1998 |
| JP | 3049140 U | 3/1998 |
| JP | 2759170 C | 10/1998 |
| JP | 10-328422 A | 12/1998 |
| JP | 11-126017 A | 5/1999 |

OTHER PUBLICATIONS

Wong, C et al. "A Mobil Robot that Recognizes People." Tools with Artificial Intelligence, 1995. Proceedings., Seventh International Conference on, Nov. 5–8, 1995. pp.: 346–353.*

Foster, J. "Voice Recognition for the IBM 7535 Robot." Southeastcon '89. Proceedings. 'Energy and Information Technologies in the Southeast'., IEEE, Apr. 9–12, 1989. pp. 759–764, vol. 2.*

Robot Engineering Handbook, pp. 450–456 and pp. 712–717 (Translation of Summary Included).

* cited by examiner

*Primary Examiner*—Richemond Dorvil
*Assistant Examiner*—Kinari Patel
(74) *Attorney, Agent, or Firm*—Faegre & Benson LLP

(57) ABSTRACT

A special relation is formed between an owner and a virtual pet and a sense for feeling a pet more similar to a true pet is produced.

Voice inputted from a microphone 22 is recognized by a recognizing part 20. Then, a speaker data base 12 is referred to to identify a speaking individual. In the data base 12, prescribed words and phrases are registered and events corresponding to the words and phrases are stored in an event list 31. If the words and phrases spoken by the individual to a pet satisfy an event generating condition, events (crying, swinging a tail, etc.) corresponding to the recognized words and phrases will be performed.

16 Claims, 3 Drawing Sheets

VIRTUAL PET DEVICE AND CONTROL PROGRAM RECORDING MEDIUM THEREFOR

TECHNICAL FIELD

The present invention relates to a pet type toy copying the form of an animal or the like, or a pet type game machine using a display imitating the configuration of an animal or the like.

BACKGROUND ART

There has been known a pet type toy provided with mechanisms for moving a mouth or a tail, etc. in the main body of a sewed-up toy copying an animal.

Further, there has been also known a portable electronic pet toy raised by giving food to a pet displayed on a display as an image in a simulating manner.

In the conventional sewed-up pet toys, there have been provided various forms of pet toys which operate in response to specific operations using batteries or spiral springs or the like as power sources, however, they have only mechanically repeated simple reactions.

Still further, in the case of a recently prevailing electronic toy, an unification feeling exists between an owner and a virtual pet housed in the electronic toy because of its portable form, however, when the toy itself is delivered to another person, an idea of a specific breeder (owner) of the toy becomes ambiguous.

In the above described conventional pet type toy, there has been encountered a problem that an owner cannot feel such interchange of feelings as can be seen in the relation between a real pet (true) and the owner and a special relation cannot formed between an operator or the owner and the virtual pet.

It is an object of the present invention to solve the above described problems of the conventional pet type toy and provide a virtual pet device in which a special relation can be established between an operator or an owner and a virtual pet and a sense more similar to a real pet can be obtained.

Further, it is another object of the present invention to provide a recording medium in which a control program of the virtual pet device is stored.

DISCLOSURE OF INVENTION

According to the present invention, there is provided a virtual pet device adapted to suitably respond to an external stimulation comprising: an input means for externally inputting a stimulation; a recognizing means for recognizing the stimulation inputted by the input means and a control means for controlling the response operation of the device on the basis of the recognized result by the recognizing means, the control means analyzing the inputted stimulation and identifying an individual who inputs the stimulation. According to the present invention, the stimulation by an operator is analyzed to identify the individual who generates the stimulation so that a special relation is established between the virtual pet and the operator. Thus, an intimate relation similar to the relation between a true pet and an owner can be produced between both the virtual pet and the operator.

The input means may be a voice input device. In this case, the operator can be identified in accordance with voice given by the operator, for instance, words and phrases.

Further, the input means may be an image input device. In this case, the operator can be identified in accordance with, for instance, the image of the face of the operator or the like.

Further, a virtual pet device preferably further comprises a memory means provided so as to identify unspecified many persons who input stimulations for storing the value of degree of recognition of each person who inputs the stimulation corresponding to the input and respond only to a person high in his recognition frequency.

According to this configuration, the voices or the images of the faces of unspecified many persons are individually recognized and an operator with high recognition frequency is determined so that a response action can be given only to an operator who most frequently comes into contact with the virtual pet. Therefore, the relation between the special operator and the virtual pet can be made more intimate. When a voice such as words and phrases is inputted, if frequency is stored individually on the basis of a unit of recognized words and phrases in respect of a recognition frequency, an individual corresponding relation can be established for each word and phrase.

Further, a virtual pet device preferably further comprises a memory means provided so as to identify unspecified many persons who input stimulations for storing the value of degree of recognition of each person who inputs the stimulation corresponding to the input and give no response to the input the value of degree of recognition of which is relatively lowered. According to this configuration, a response may not be given to the input whose relative value of degree of recognition is lowered and a feeling of actuality can be improved, because an operation that knowledge (memory) is forgotten is generated like real living things. Further, since the virtual pet learns again, for instance, words and phrases as the input of voice (increase the value of degree of recognition) so that the virtual pet responds again to the inputs, the operator can effectively obtain more a feeling of satisfaction.

Further, a virtual pet device may comprise a memory means provided so as to identify unspecified many persons who input stimulations for storing the value of degree of recognition of each person who inputs the stimulation corresponding to the input and sequentially delete the inputs whose values of degree of recognition are relatively lowered.

Still further, a virtual pet device preferably further comprises a memory means provided so as to identify unspecified many persons who input stimulations for storing the value of degree of recognition of each person who inputs the stimulation corresponding to the input and change a response action to the same input depending on a person who inputs the stimulation and the value of degree of recognition. According to this configuration, different reactions can be presented even to the same words and phrases in accordance with, for instance, the difference in the values of degrees of words and phrases or operators, so that a virtual pet device with high actuality can be provided.

Still further, a virtual pet device preferably further comprises a memory means for storing the date of an input for each person who inputs the stimulation to change a response action depending on the lapse of time from the date of a final input.

Still further, a virtual pet device preferably includes a plurality of preset basic actions and the combination of words and phrases corresponding to each action so as to newly set the relation between a series of actions obtained by combining the basic actions together and the words and phrases corresponding thereto. Thus, the corresponding relation between a plurality of combinations of the basic actions and the new words and phrases can be set and a more complicated response action can be achieved. Therefore, a user can acquire a sense as if the user actually trained a real pet.

Still further, in a recording medium for storing a control program of a virtual pet according to the present invention, the control program is adapted to recognize a signal inputted from a stimulation inputting means as a stimulation, control a response action on the basis of the recognized result, analyze the stimulation thus recognized and identify an individual who inputs the stimulation.

In the recording medium, can be stored a program for controlling to recognize a voice signal serving as the input signal as a stimulation.

Further, in the recording medium, can be stored a program for controlling to recognize an image signal serving as the input signal as a stimulation.

Still further, in the recording medium, a program can be stored for controlling to identify unspecified many persons who input stimulations by analyzing the stimulations, store the value of degree of recognition of each person who inputs the stimulation corresponding to the input and respond only to a person who inputs the stimulation high in his recognition frequency.

Still further, in the recording medium, a program can be stored for controlling to identify unspecified many persons who input stimulations by analyzing the stimulations, store the value of degree of recognition of each person who inputs the stimulation corresponding to the input and give no response to the input whose value of degree of recognition is relatively lowered.

Still further, in the recording medium, a program can be stored for controlling to identify unspecified many persons who input stimulations by analyzing the stimulations, store the value of degree of recognition of each person who inputs the stimulation corresponding to the input and sequentially delete inputs whose values of degrees of recognition are relatively lowered.

Still further, in the recording medium, a program can be stored for controlling to identify unspecified many persons who input stimulations by analyzing the stimulations, store the value of degree of recognition of each person who inputs the stimulation corresponding to the input and change a response action to the same input depending on persons who input the stimulations and the values of degrees of recognition.

Furthermore, in the recording medium, a program can be stored for controlling to identify unspecified many persons who input stimulations by analyzing the stimulations, store the input date of each person who inputs the stimulation corresponding to the input and change a response action depending on the lapse of time from the date of a final input.

Besides, in the recording medium, can be stored a program including a plurality of preset basic actions and the combination of words and phrases corresponding to each action and controlling to newly set the relation between a series of actions obtained by combining the basic actions together and the words and phrases corresponding thereto.

In this case, for instance, when the input means is a voice input device, the above described input designates words and phrases, and when the input means is an image input device, it indicates the image of a face or the like.

BEST MODE FOR CARRYING OUT THE INVENTION

Figure 1:
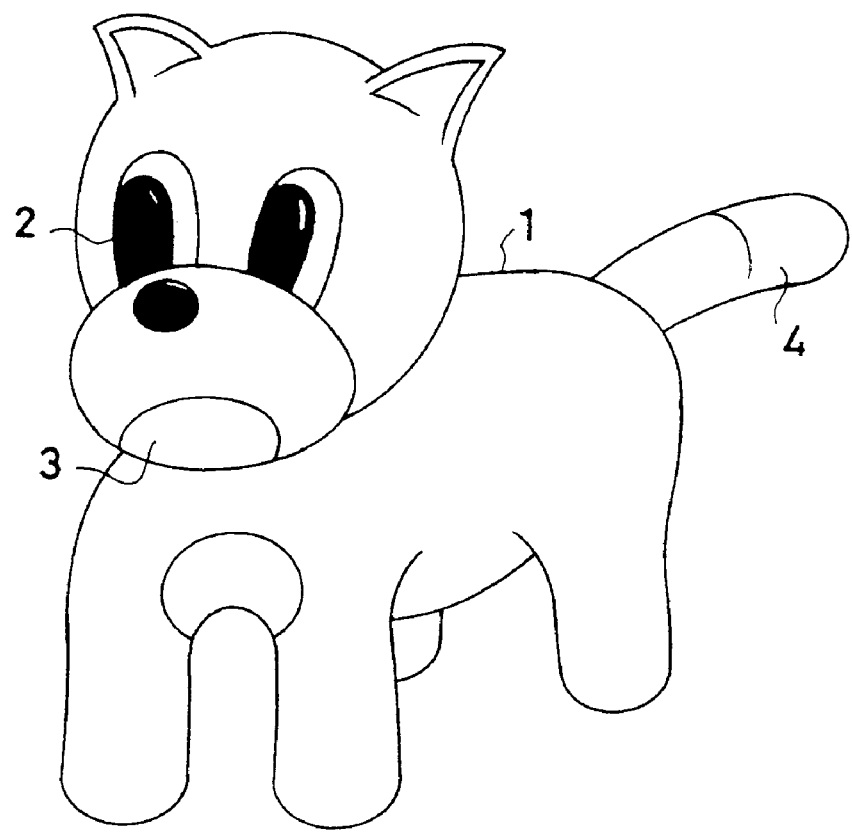
FIG. 1 is a perspective view showing a virtual pet according to one embodiment of the present invention.

FIG. 1 shows the appearance of one example of a virtual pet according to the present invention. As shown in FIG. 1, the virtual pet showing one embodiment of the present invention is configured in the shape of a dog as a sewed-up toy and eyes 2, a mouth 3 and a tail 4 or the like are provided in a main body (the body part) 1. A control part which will be described below is incorporated in the main body 1. In addition, operating mechanisms, which are not shown, for moving the head part of the dog or swinging the tail or the like are provided and each mechanism can be controlled by the control part.

Figure 2:
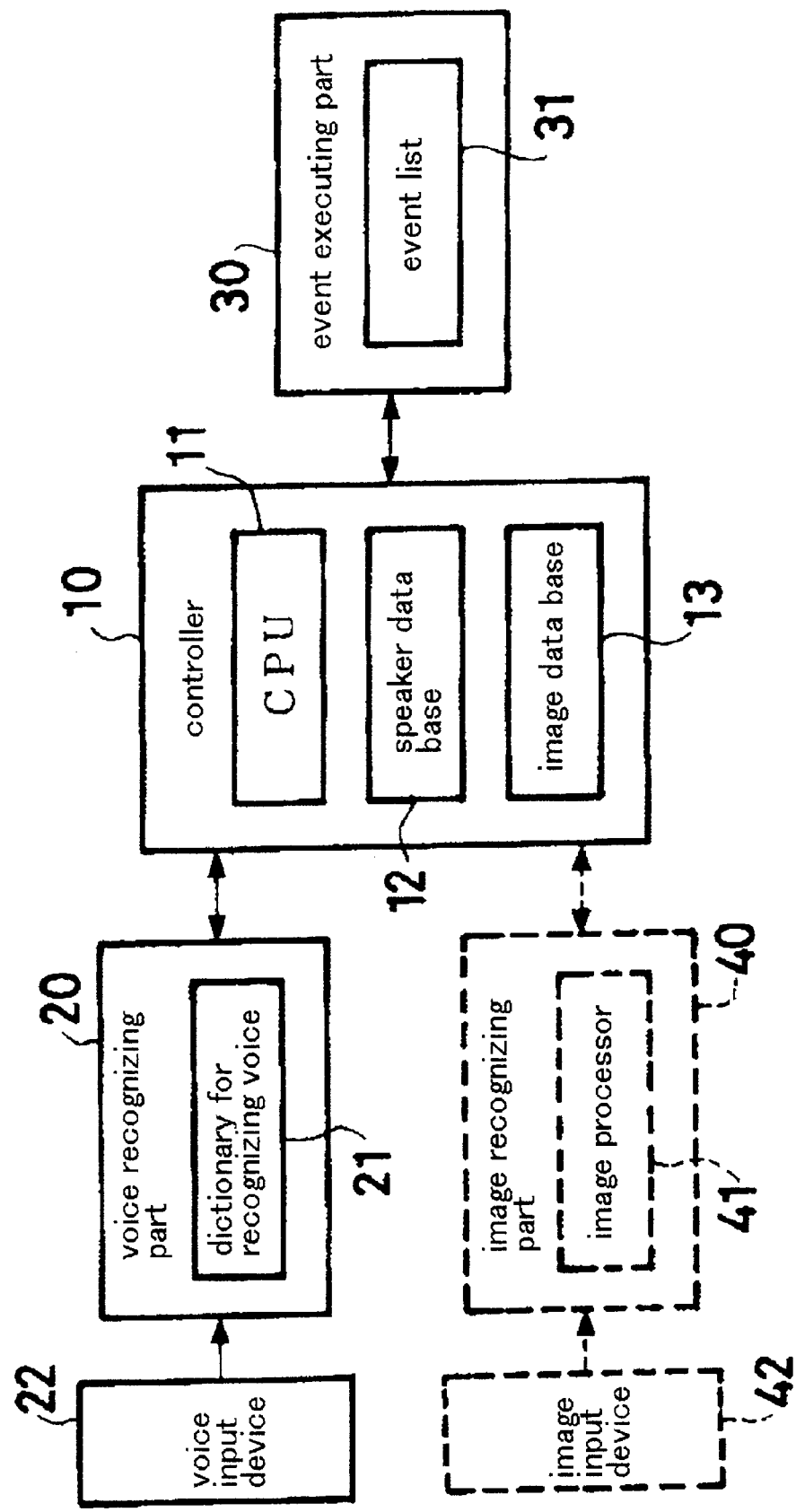
FIG. 2 is a block diagram showing the configuration of a control part provided in the main body of the virtual pet.

FIG. 2 is a block diagram showing the configuration of the control part provided in the main body 1. As shown in this figure, the control part in the present embodiment comprises a controller 10 at a central part, a voice recognizing part 20, an event executing part 30 and an image recognizing part 40, etc.

The controller 10 is provided with a ROM, a RAM, etc. not shown as well as a CPU 11. Further, in the controller 10 a speaker data base 12 and an image data base 13 are provided. These data bases can be stored in a memory or other memory means.

In the voice recognizing part 20 a dictionary 21 for recognizing a voice is provided. Then, a voice inputted from a voice input device (microphone) 22 is recognized. The voice recognizing part 20 is connected to the controller 10 to output a recognized voice to the controller 10 or receive a control signal from the controller 10. The dictionary 21 for recognizing a voice may be updated in accordance with a command from the controller 10. Otherwise, the dictionary 21 for recognizing a voice may be replaced by another dictionary. Further, the microphone 22 can be installed in a suitable position of the dog as the sewed-up toy shown in FIG. 1, and preferably disposed in the head part or near a front chest part of the dog.

An event list 31 is stored in the event executing part 30. In the event list, the list of events which can be performed by the virtual pet according to the present embodiment is stored. As examples of the events, there may be set suitable events such as the output of a sound (imitation sound) or a voice, or actions through the operating mechanisms not shown such as moving a neck, swinging a tail, etc.

According to the present embodiment, an image processor 41 is included in the image recognizing part 40. The image processor 41 processes an image inputted from an image input device 42 and sends its output to the controller 10. As the image input device 42, for example, a CCD camera can be employed and arranged at the position of the eyes 2 shown in FIG. 1.

The speaker data base 12 in the present embodiment is adapted to identify an operator who speaks to the main body 1. The configurational example of the speaker data base is shown in the following table 1.

TABLE 1

Speaker Data Base

| speaker | 1 | 2 | 3 |
|---|---|---|---|
| estimation of male or female | female | male | female |
| estimation of age | child | adult | adult |
| similarity to dictionary | A1 | B1 | A2 |
| words and phrases 1 | 17 | 13 | 6 |
| words and phrases 2 | 12 | 4 | 8 |
| words and phrases 3 | 7 | 6 | 14 |
| words and phrases 4 | 15 | 2 | 9 |
| words and phrases 5 | 4 | 13 | 3 |
| corresponding image | image 1 | image 3 | image 4 |
| date of final recognition | 11/20 | 10/01 | 11/04 |

In the present embodiment, the voice of the operator inputted from the voice input device 22 is recognized in the voice recognizing part 20. As shown in the table 1, sex data obtained by estimating a male or a female, age data obtained by estimating age (a child or an adult), similarity rank data obtained by comparing with the incorporated dictionary 21, the recognition degree data of relevant words and phrases showing the number of times of recognition of words and phrases corresponding to previously registered words and phrases (here, words and phrases 1 to words and phrases 5), date data indicating the date on which the speaker is recognized lastly or the like are accumulated to construct the data base. In the table 1, corresponding image data is also shown.

A next table 2 shows the configurational example of an optional image data base.

TABLE 2

Image Data Base

| image data | image 1 | image 2 | image 3 | image 4 |
|---|---|---|---|---|
| size of face | small | small | large | intermediate |
| space between eyes | narrow | ordinary | wide | ordinary |
| relative relation between eyes, nose and mouth | pattern A1 | pattern B1 | pattern B2 | pattern B1 |

The image data base is composed of image data obtained as a result of processing an image inputted from the image input device 42 in the image processor 41 and sending the image data to the controller 10 from the image recognizing part 40. Here, the image data base, as one example, is composed of data including the size of the faces of speakers, the spaces between eyes, the patterns of the relative relations between eyes, noses and mouths, etc. The image data of the speakers stored in this image data base is stored as images corresponding to the individual speakers in the above described speaker data base.

According to the virtual pet of the present embodiment, in case the image recognition is utilized, even when an owner does not consciously input an image, the virtual pet recognizes a specific companion (recognizing the image) and barks at this companion. For example, if a substantial body such as a pet robot exists, the virtual pet will come near to the pet robot. As described above, the virtual pet can carry out a spontaneous behavior. Further, the inputs are combined with inputs using a switch or a sensor or the like, so that the value of degree of recognition or the number of times of recognition upon input is stored similarly to the recognition of voice and the response of the virtual pet can be different depending on the contact frequency of an operator. The response of the virtual pet may differ in such a manner that the virtual pet spontaneously comes near to an operator high in the value of degree of recognition and barks at an operator low in the value of degree of recognition.

In the virtual pet according to the present embodiment, in order to produce a specific relation between the speaker (operator) and the virtual pet, that is to say, a sense imitating the interchange between a real pet and an owner, the voices of unspecified many speakers who speak to the virtual pet are individually identified and the speaker high in his recognition frequency is determined so that a response is given only to the speaker who most frequently comes into contact with the virtual pet (speaking to the virtual pet). Now, a control for generating a special relation between the speaket (operator) and the virtual pet will be described by referring to a flowchart shown in FIG. 3.

Figure 3:
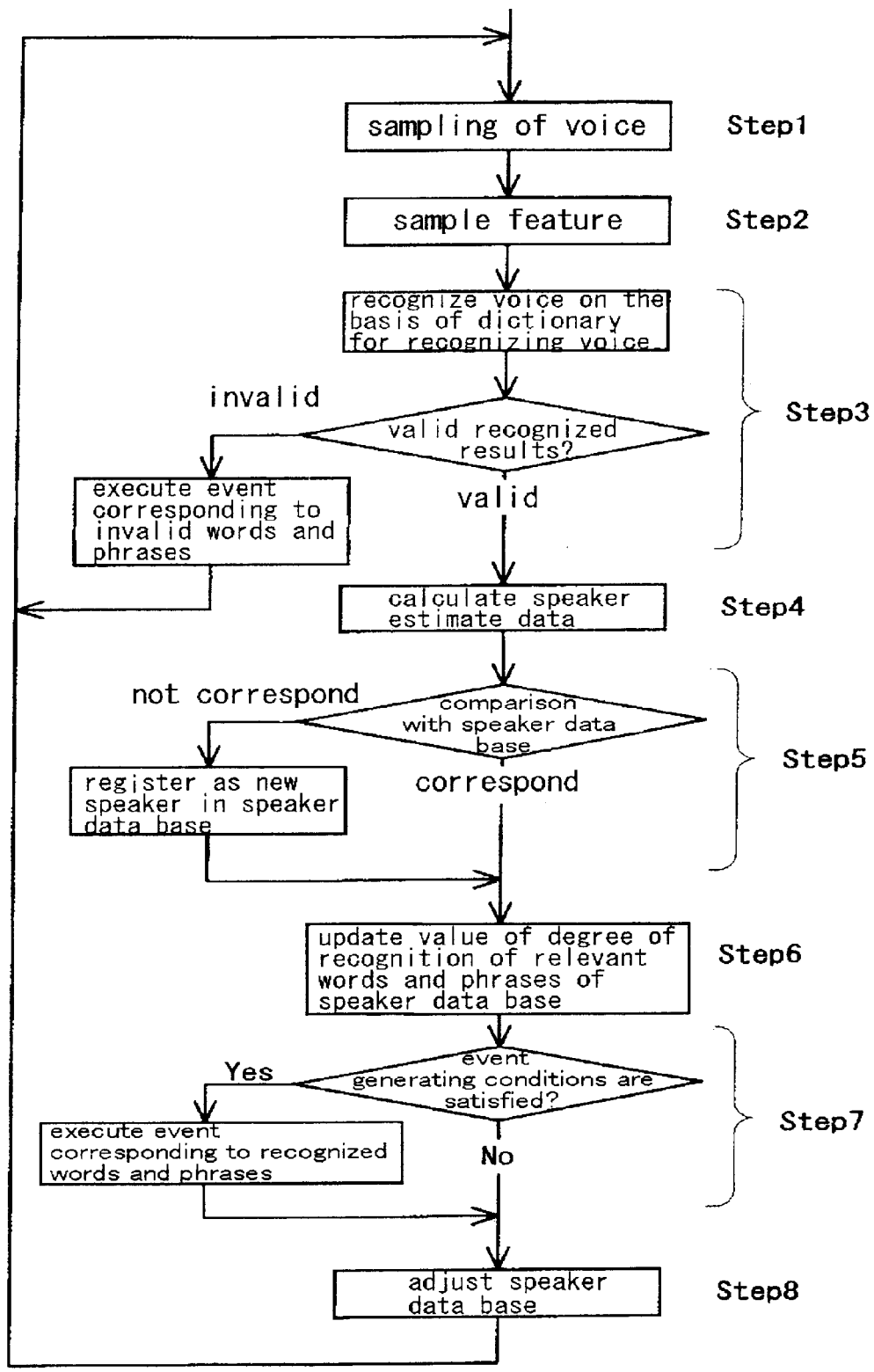
FIG. 3 is a flowchart showing a control for generating a prescribed relation between an operator and the virtual pet in the embodiment of the present invention.

In the flowchart shown in FIG. 3, when the speaker speaks to the virtual pet, the voice of the speaker is sampled. That is to say, an analog sound inputted from the microphone 22 is subjected to a pre-processing such as a band limitation or a noise reduction, etc. and the preprocessed sound is digitally converted (step 1). Then, features necessary for recognizing voices and estimating speakers (step 2). Then, the voice is recognized on the basis of the dictionary 21 for recognizing the voices to decide whether or not a recognized result is valid (step 3). The decision of validity/invalidity is checked on the basis of whether valid words and phrases corresponding to the event list 31 are inputted or not. When it is decided that the invalid words and phrases are inputted, after an event for informing the speaker of the invalid words and phrases is executed, the input of new words and phrases is waited for. As an event corresponding to the invalid words and phrases, is exemplified, for example, an action of "putting a head on one side" or the like.

From the feature data sampled in the step 2, a male or a female and age which constitute a reference for specifying a speaker are estimated and a total similarity is calculated to obtain speaker estimate data (step 4). The calculated speaker estimate data is compared with the data of the speaker data base 12 by referring to it. When the speaker estimate data does not correspond to the speakers exisiting in the data base, the speaker estimate data is registered in the speaker data base 12 (step 5).

Then, the value of degree of recognition of the relevant words and phrases (words and phrases corresponding to a speech given to the virtual pet) of the relevant speaker (a new speaker in the case of a new speaker) in the speaker data base 12 is updated (step 6).

If the recognized relevant words and phrases satisfy the event generating conditions, an event corresponding to the recognized words and phrases will be executed (step 7). Here, the event generating conditions including a case 1 where the value of degree of recognition not lower than a prescribed threshold value is obtained and a case 2 where each speaker of the speakers speaking each of words and phrases reaches a maximum value of degree of recognition, etc. are set in accordance with their uses.

In the case of the speaker data base shown in the above mentioned table 1, when the threshold value is 10 under the condition of 1, the words and phrases 1, the words and phrases 2 and the words and phrases 4 are valid (staisfy the event generating condition) for the speaker 1. The words and phrases 1 and the words and phrases 5 are valid for the speaker 2, and an event corresponding only to the words and phrases 3 is valid for the speaker 3. Similarly, in the case of the condition 2, the speaker 1 is valid in respect of the words and phrases 1, the speaker 1 is valid in respect of the words and phrases 2, the speaker 3 is valid as to the words and phrases 3, the speaker 1 is valid as to the words and phrases 4 and the speaker 2 is valid in respect of the words and phrases 5, respectively.

These conditions may be set for each of words and phrases, may be commonly set for all the words and phrases and may be set so as to be effective (the event is generated) only when both the conditions are simultaneously satisfied.

Further, since the date of the final recognition of each speaker is recorded in the speaker data base 12, when a long period passes relative to a current time, it is also possible to perform a setting to change the behavior of the virtual pet (change the event) or the like.

For example, in case the value of degree of recognition of a person who perform an input operation is generally high, when the lapse of time from the date of a final recognition is short, the virtual virtual pet carries out an ordinary action. When the lapse of time from the final recognition is long, the vitrtual pet performs an excessive action as if the pet were excessively pleased when the owner returns from his short trip. When the lapse of time is extremely long, the virtual pet performs a warning action such as barking or growling as if the pet forgot the owner.

On the contrary, in case the value of degree of recognition of a person who performs an input operation is generally low, when the lapse of time from the date of a final recognition is short, the virtual pet performs an ordinary action like the above described case (the case where the value of degree of recognition of a person who performs an input operation is generally high). However, when the laspe of time from the final recognition is long, the virtual pet performs a warning action as if the pet forgot the owner faster than the above mentioned case. When the lapse of time from the final recognition is extremely long, the virtual pet performs a behavior (inoperative) for neglecting an input.

Further, in case the value of degree of recognition of a person who performs an input operation is generally high, when a non-input state is kept to some degree, the virtual pet may carry out a spontaneous action such as crying as if the pet felt lonely.

The date of the final recognition may be stored for each of words and phrases.

Further, different events may be set to be performed even under the same words and phrases, depending on the difference in the value of degree of recognition of the words and phrases or person who inputs a stimulation. For example, if a speaker low in the value of degree of recognition says "good morning" to the virtual pet, the virtual pet may be set to respond to him by barking only once "bow-wow". On the contrary, if a speaker high in the value of degree of recognition says "good morning" to the virtual pet, the virtual pet may be set to perform an event of "swinging a tail" or to respond to him by barking three times "bowwow, bowwow, bowwow".

Since the area of the value of degree of recognition of the speaker data base 12 is limited, this area will overflow in future. Thus, when the condition 1 is set as the condition in the step 7, the event is not be actually generated. Further, if all the words and phrases exceed the threshold value, the virtual pet will react to any word and phrase of anybody (exclude the condition 2). Therefore, there exists a fear that a special relation between the speaker and the pet is lost. In order to avoid such situations, the value of degree of recognition of each valid event (the value of degree of recognition of words and phrases generating the valid event) is readjusted and the speaker data base 12 is adjusted (step 8) by adjusting the values of degree or the threshold values so that the events relatively low in the value of degree of recognition are made invalid again to wait for a next input of voice.

The virtual pet according to the present embodiment is configured as a dog. The corresponding relation as described below is previously set as the combination of the basic actions of the pet and recognized words and phrases.

words and phrases: "raise a hand"=action: "raise a hand (a front leg)".
words and phrases: "sit down"=action : "sit"
words and phrases: "turn"=action "turn"
words and phrases "bark bowwow"=action: "bark"

Since the corresponding relation between a plurality of combinations of these basic actions and new words and phrases (speech) can be set, more complicated actions can be performed by the virtual pet. For example, for the words and phrases of "turn three times and bark "bowwow"", the virtual pet can perform a turning action three times and then carry out an action of "barking". Such a new corresponding relation (a corresponding relation between the words and phrases and the action) is formed, hence a user can obtain a sense as if he trained a true pet, which cannot be obtained from a work for simply setting actions to the conventional sewed-up toy of a dog.

Although the present invention is described by way of the embodiment shown in the drawings, it should be noted that the present invention is not limited thereto. For example, the appearance of the virtual pet is not limited to the dog, and may be arbitrarily set to an animal such as a cat, a panda, or a character of a cartoon, an animation, etc. Further, the virtual pet may not be configured as a sewed-up toy having a substantial body but as an electronic pet displayed on a display means. It should be noted that the electronic pets may assume configurations operated on an exclusively used game machine or a general purpose personal computer. In this case, a recording medium in which a control program for mainly executing the processings shown in the flowchart of FIG. 3 is stored, such as a CD-ROM or a cassette type ROM, etc. is set to the exclusively used game machine or the general purpose personal computer to execute a game program stored therein.

Further, the stimulation given to the virtual pet is not limited to a voice and, for instance, an image (the face of an operator or the like) through the image input device, a contact through a microswitch sensor or the like, or a key input from an operating part, or various kinds of input signals through a remote controller and communication, etc. may be employed.

Still further, needless to say, the contents of the configuration of the data base for identifying the operators are not limited to the embodiment of the present invention, and the data base may be composed of arbitrary contents. It should be noted that the setting of the words and phrases is not limited. Further, the events carried out so as to meet them are not limited to the output of sound or the actions and can be arbitrarily set to a light emission, an oscillation, etc. Besides, in the electronic pet, may be considered the generation of events in a variety of forms such as the change or growth of a configuration and color, the creation of friends and lovers, the birth of children, the change of the living environment of the pet, etc.

What is claimed is:

1. A virtual pet device adapted to suitably respond to an external stimulation comprising: an input means for externally inputting a stimulation; a recognizing means for recognizing the stimulation inputted by the input means and a control means for controlling response operation of the device on the basis of the recognized result by the recognizing means, said control means analyzing the inputted stimulation and identifying an individual who input the stimulation, further comprising a memory means provided so as to identify unspecified many persons who input stimulations for storing the value of degree of recognition of each person who inputs the stimulation corresponding to the input and only a person high in his recognition frequency being answered.

2. A virtual pet device adapted to suitably respond to an external stimulation comprising: an input mean for externally inputting stimulation; a recognizing means for recognizing the stimulation inputted by the input means and a control means for controlling response operation of the device on the basis of the recognized result by the recognizing means, said control means analyzing the inputted stimulation and identifying an individual who inputs the stimulation, further comprising a memory means provided so as to identify unspecified many persons who input stimulations for storing the value of degree of recognition of each person who inputs the stimulation corresponding to the input and a response being not given to the input the value of degree of recognition of which is relatively lowered.

3. A virtual pet device adapted to suitably respond to an external stimulation comprising: an input means for externally inputting a stimulation; a recognizing means for recognizing the stimulation inputted by the input means and a control means for controlling response operation of the device on the basis of the recognized result by the recognizing means, said control means analyzing the inputted stimulation and identifying an individual who inputs the stimulation, further comprising a memory means provided so as to identify unspecified many persons who input stipulations for storing the value of degree of recognition of each person who inputs the stimulation corresponding to the input and the inputs whose values of degree of recognition are relatively lowered being sequentially deleted.

4. A virtual pet device adapted to suitably respond to an external stimulation comprising; an input means for externally inputting a stimulation; a recognizing means for recognizing the stimulation inputted by the input means and a control means for controlling response operation of the device on the basis of the recognized result by the recognizing means, said control means analyzing the inputted stimulation and identifying an individual who inputs the stimulation, further comprising a memory means provided so as to identify unspecified many persons who input stimulations for storing the value of degree of recognition of each person who inputs the stimulation corresponding to the input and a response action to the same input being capable of being changed depending on a person who inputs the stimulation and the value of degree of recognition.

5. A virtual pet device adapted to suitably respond to an external stimulation comprising: an input means for externally inputting a stimulation; a recognizing means for recognizing the stimulation inputted by the input means and a control means for controlling response operation of the device on the basis of the recognized result by the recognizing means, said control means analyzing the inputted stimulation and identifying an individual who inputs the stimulation, further comprising a memory means for storing the date of an input for each person who inputs the stimulation and a response action being capable of being changed depending on the lapse of time from the date of a final input.

6. A virtual pet device according to any one of claims 1–5, wherein said input means is a voice input device.

7. A virtual pet device according to claim 6, wherein there are provided a plurality of preset basic actions and the combination of words and phrases corresponding to each action and the relation between a series of actions obtained by combining the basic actions together and the words and phrases corresponding thereto can be newly set.

8. A virtual pet device according to any one of claims 1–5, wherein said input means is an image input device.

9. A recording medium storing a control program of a virtual pet suitably responding to an external stimulation, said control program being adapted to recognize a signal inputted from a stimulation inputting means as a stimulation, control a response action on the basis of the recognized result, analyze the stimulation thus recognized and identify and individual who inputs the stimulation, in which a program is stored for controlling to identify unspecified many persons who input stimulations by analyzing the stimulations, store the value of degree of recognition of each person who inputs the stimulation corresponding to the input and respond only to a person who inputs the stimulation high in his recognition frequency.

10. A recording medium storing a control program of a virtual pet suitably responding to an external stimulation, said control program being adapted to recognize a signal inputted from a stimulation inputting means as a stimulation, control a response action on the basis of the recognized result, analyze the stimulation thus recognized and identify and individual who inputs the stimulation, in which a program is stored for controlling to identify unspecified many persons who input stimulations by analyzing the stimulations, store the value of degree of recognition of each person who inputs the stimulation corresponding to the input and not to respond to the input whose value of degree of recognition is relatively lowered.

11. A recording medium storing a control program of a virtual pet suitably responding to an external stimulation, said control program being adapted to recognize a signal inputted from a stimulation inputting means as a stimulation, control a response action on the basis of the recognized result, analyze the stimulation thus recognized and identify and individual who inputs the stimulation, in which a program is stored for controlling to identify unspecified many persons who input stimulations by analyzing the stimulations, store the value of degree of recognition of each person who inputs the stimulation corresponding to the input and sequentially delete inputs whose values of degrees of recognition are relatively lowered.

12. A recording medium storing a control program of a virtual pet suitably responding to an external stimulation, said control program being adapted to recognize a signal inputted from a stimulation inputting means as a stimulation, control a response action on the basis of the recognized result, analyze the stimulation thus recognized and identify and individual who inputs the stimulation, in which a program is stored for controlling to identify unspecified many person who input stimulations by analyzing the stimulations store the value of degree of recognition of each person who inputs the stimulation corresponding to the input and change a response action to the same input depending on persons who input the stimulations and the values of degrees of recognition.

13. A recording medium storing a control program of a virtual pet suitably responding to an external stimulation, said control program being adapted to recognize a signal inputted from a stimulation inputting means as a stimulation, control a response action on the basis of the recognized result, analyze the stimulation thus recognized and identify and individual who inputs the stimulation, in which a program is stored for controlling to identify unspecified many persons who input stimulations by analyzing the stimulations, store an input data of each person who inputs the stimulation corresponding to the input and change a response action depending on the lapse of time from the date of a final input.

14. A recording medium according to any one of claims 9–13, in which is stored a program for controlling to recognize a voice signal as the input signal as a stimulation.

15. A recording medium according to claim 14, in which is stored a program including a plurality of preset basic actions and the combination of words and phrases corresponding to each action and controlling to newly set the relation between a series of actions obtained by combining the basic actions together and the words and phrases corresponding thereto.

16. A recording medium according to any one of claims 9–13, in which a program is stored for controlling to recognize an image signal as the input signal as a stimulation.

* * * * *